United States Patent Office 3,817,940
Patented June 18, 1974

3,817,940
AROMATIC DIAMINES
Johannes Blahak, Cologne-Buchheim, and Erwin Muller and Helmut Kleimann, Leverkusen, Germany, assignors to Bayer Aktiengesellschaft, Leverkusen, Germany
No Drawing. Original application Aug. 12, 1971, Ser. No. 171,381. Divided and this application Mar. 9, 1973, Ser. No. 339,667
Claims priority, application Germany, Aug. 17, 1970, P 20 40 644.4
Int. Cl. C08g 22/00
U.S. Cl. 260—77.5 AM    7 Claims

ABSTRACT OF THE DISCLOSURE

Novel aromatic diamines having the general formula

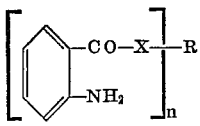

wherein $n$ is an integer of from 2 to 8, X is sulfur or oxygen, and R is an $n$-valent hydrocarbon radical which may be interrupted by O or S atoms and which is obtained by removing OH or SH groups from a polyol or polythiol having a molecular weight of less than 600, are prepared by reacting a compound having the formula $(HX)_nR$ where X, $n$ and R are as defined above with about $n$-equivalents of an isatoic acid anhydride in the presence of a strong base. The aromatic diamines of the invention are particularly useful as the active hydrogen containing component for reaction with polyisocyanates in the preparation of synthetic resins by the isocyanate-polyaddition process.

---

This is a division of application Ser. No. 171,381 filed Aug. 12, 1971.

The compounds according to the invention are new chain lengthening agents for the synthesis of synthetic resins by the diisocyanate polyaddition process. They have an advantageous influence both on the working up process and on the mechanical properties of the synthetic resins obtained and therefore assume a pre-eminent position among the chain lengthening agents hitherto known.

Chain lengthening agents used for the synthesis of elastic polyurethane resins are, for example, aromatic diamines such as 4,4'-diamino-3,3'-dichloro-diphenylmethane. These amines carry a chlorine atom in the ortho position to the amino group. This chlorine atom reduces the reactivity of the aromatic amino group towards the isocyanate group, thereby providing advantageous conditions (e.g. sufficient pouring time) for working up in the liquid phase or for the foaming process.

The present invention relates to aromatic diamines of the general formula

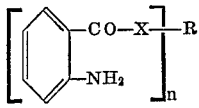

in which $n$ represents an integer of from 2 to 8,
X represents oxygen or sulphur and
R represents an $n$-valent saturated or unsaturated, straight chain or branched chain hydrocarbon radical, if desired, interrupted by oxygen and/or sulphur atoms, of the type which may be obtained by partial removal of the OH and/or SH groups from a polyol or polythiol of molecular weight 76 to 599.

The surprising observation was made that the ester group which is in the ortho position to the amino group in the compounds according to the invention so greatly diminishes the reactivity of the amino group towards isocyanates that, as can be seen from kinetic measurements, the new compounds take up an intermediate position, as regards their reactivity, between aliphatic glycols which have hitherto been used as chain lengthening agents and the ortho-chloro-substituted aromatic diamines already mentioned above. This means that the ester group in the ortho position has a much stronger effect in reducing the reactivity of the amino group than a chlorine atom in the ortho position.

The compounds according to the invention are therefore eminently suitable for the synthesis of polyurethane resins in enabling this to be carried out by an even more convenient process due to the substantial increase in the pouring time combined with a shorter than average setting time which enables the cast synthetic resins to be quickly removed from the mould. This fact provides the necessary conditions for improved technical working up.

Furthermore, the properties of the synthetic resins obtained are influenced very advantageously by the incorporation of the new chain lengthening agents.

The use of bifunctional products according to the invention having the following constitution:

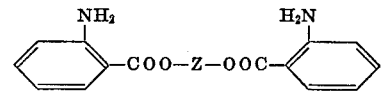

Z=alkylene radical having 2 to 18 carbon atoms, e.g.:

$$-(CH_2)_4-; \ -(CH_2)_2-S-(CH_2)_2-$$
$$-(CH_2)_2-O-(CH_2)_2-$$

leads, for example, to soft synthetic resins which have little elasticity and are in some cases very suitable for the production of floor coverings, grouting compositions and pressure roller compositions.

The following are examples of compounds according to the invention:

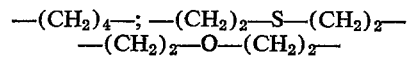

preferred

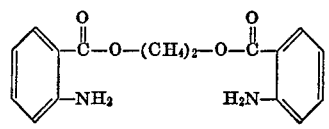

preferred

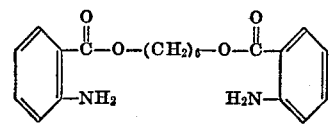

preferred

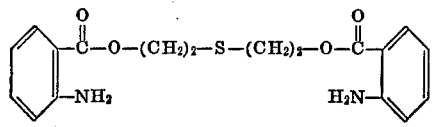

preferred

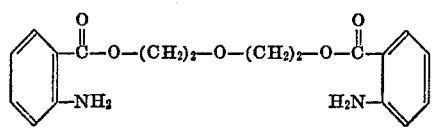

preferred

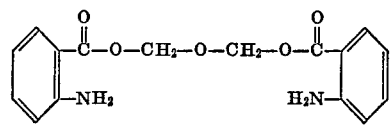

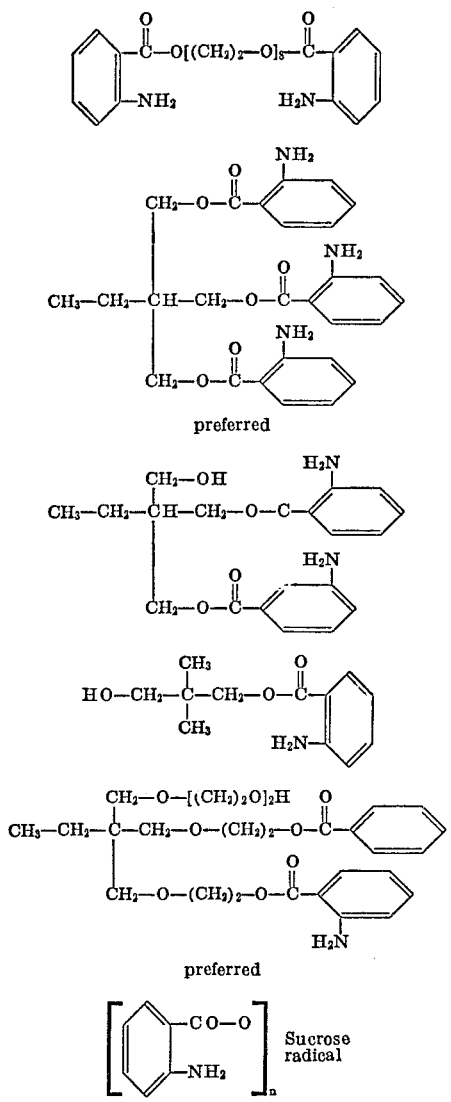

preferred

 Sucrose radical

These trifunctional compounds provide high moduli of elasticity and improved temperature resistance, especially in hard foam resins.

The chain lengthening agents according to the invention may be obtained e.g. as follows:

Compounds of the general formula $$(HX)_nR$$

which have a molecular weight of 76 to 599 and in which X, n and R have the meanings already defined above are reacted with about n equivalents (about meaning 0.8 to 1.2 equivalents) of isatoic acid anhydride in the presence of strong bases such as sodium hydroxide or triethylamine, preferably in solvents which do not react with isatoic acid anhydride, e.g. in ethers or ketones and preferably in tetrahydrofuran or dioxane, at temperatures generally in the region of 40° C. to 130° C. and preferably in the region of 60° C. to 110° C. After filtration and removal of the solvent, the product of the process can be purified, e.g. by recrystallisation from aqueous dioxane or ethanol.

If the compound $R(XH)_n$ is to be reacted completely with isatoic acid anhydride, the quantity of isatoic acid anhydride used should be equal to n equivalents whereas if it is not intended to react all the XH groups with isatoic anhydride, the quantity of isatoic acid anhydride put into the reaction should be less than n equivalents. It is, however, preferable to react the compounds $R(XH)_n$ completely with isatoic acid anhydride, using n or more than n equivalents of isatoic anhydride.

A typical example will now be given to explain the process of preparation:

134 g. (1 mol) of trimethylolpropane in 900 ml. of dioxane which has been dried over 18 g. of potassium carbonate are heated to 90° C. with 589 g. (3.6 mol) of isatoic acid anhydride. After 81 l. of carbon dioxide have escaped, the produce is filtered with suction. After removal of the solvent on a rotary evaporator, the first product obtained is a syrupy liquid which soon crystallises.

450 g. of this crude product are recrystallised from 400 ml. of ethanol to yield 400 g. (82% of the theory) of white crystals of trimethylol propane trianthranilate of melting point 106° C.

Calculated: C, 66.0%; H, 6.0%; N, 8.6%. Found: C, 66.0%; H, 6.3%; N, 8.6%.

The following, for example, were obtained in analogous manner:

Butane diol dianthranilate; melting point: 107° C. to 108° C. Calculated: C, 65.8%; H, 6.15%; N, 8.54%. Found: C, 65.7%; H, 6.3%; N, 8.5%.

Thiodiglycol dianthranilate; melting point: 69° C. to 70° C. Calculated: C, 60.1%; H, 5.5%; N, 7.8%; S, 8.9%. Found: C, 60.4%; H, 5.8%; N, 7.6%; S, 8.9%.

Diethylene glycol dianthranilate; melting point: 105° C. to 106° C. Calculated: C, 62.8%; H, 5.85%; N, 8.5%. Found: C, 63.0%; H, 5.9%; N, 8.2%.

Hexane diol dianthranilate; melting point: 74° C. to 75° C. Calculated: C, 67.4%; H, 6.7%; N, 7.9%. Found: C, 67.5%; H, 6.9%; N, 8.0%.

A polyether of trimethylolpropane and ethylene oxide of average molecular weight 306 which has been partly reacted (on 2 of the 3 OH groups) with isatoic acid anhydride:

Viscous oil:
500 mg. ≙ 18.15 ml. N/10 $HClO_4$ in glacial acetic acid. Indicator: 0.1% solution of Crystal Violet in glacial acetic acid (theoretical). Found: 18.2 ml. N/10 $HClO_4$.

Tripropylene glycol as dianthranilate:

Viscous oil:
500 mg. ≙ 23.3 ml. N/10 $NClO_4$ (theoretical). Found: 23.4 ml. N/10 $HClO_4$.

Polyether of trimethylolpropane and ethyleneoxide having an average molecular weight of 306 partly reacted (on 2 of the 3 OH groups) with isatoic acid anhydride:

Viscous oil:
500 mg. ≙ 18.3 ml. N/10 $HClO_4$ (theoretical). Found: 18.15 ml. N/10 $HClO_4$.

The present invention therefore relates to a process for the preparation of aromatic diamines having the general formula $$\left[ \begin{array}{c} \text{—CO—X—} \\ \text{—NH}_2 \end{array} \right]_n R$$

in which n represents an integer of from 2 to 8:
X represents an oxygen or sulphur atom and
R represents an n-valent saturated or unsaturated, straight-chain or branched chain hydrocarbon radical, if desired, interrupted by O and/or S atoms of the type obtained by removal of OH and/or SH groups from a polyol or polythiol having a molecular weight of 76 to 599, Characterised in that a compound of the general formula $$(HX)_nR$$

having a molecular weight of 76 to 599 is reacted with more or less than n equivalents of isatoic acid anhydride in the presence of strong bases.

The strong base is preferably sodium hydroxide, 0.01 to 0.1 mol of sodium hydroxide, preferably 0.05 mol of sodium hydroxide being used per mol of HX groups.

The starting material of the general formula $$(HX)_nR$$

in which X, n and R have the meaning already mentioned above may be polyols or polythioalcohols having a molecular weight of 76 to 599, e.g. propane-1,2-diol and propane-1,3-diol, butanediol, hexanediol, nonanediol, trimethylolpropane, pentaerythritol, sorbitol, glucose, diethyleneglycol, thiodiglycol, hydroquinone, 4,4'-dihydroxydiphenylmethane, 4,4'-dihydroxydiphenyldimethylmethane or 1,5-dihydroxynaphthalene. Diols having a molecular weight of 76 to 599 and triols having a molecular weight of 92 to 599 are preferred. Other starting compounds which are also especially advantageous are propanediol, butane-1,4-diol, hexane-1,6-diol, thiodiglycol, diethylene glycol and trimethylolpropane.

The present invention also relates to the use of aromatic diamines of the general formula

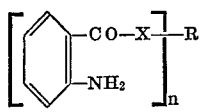

in which n represents and integer of from 2 to 8,
X represents an oxygen or sulphur atom and
R represents an n-valent saturated or unsaturated, straight-chain or branched chain hydrocarbon radical if desired, interrupted by O and/or S atoms of the type which may be obtained by complete or partial removal of OH and/or SH groups from a polyol or polythiol having a molecular weight below 600 as reactants for polyisocyanates in the production of synthetic resins by the isocyanate polyaddition process.

In this case, the aromatic diamines which may be used also include those which are obtained by reacting isatoic acid anhydride with polyols or polythioalcohols which have a molecular weight below 76. This means that apart from the polyols and polythiols already mentioned above, compounds such as ethylene glycol or the corresponding thioanalogue are also suitable for use as starting materials for the compounds which are to be used according to the invention.

The production of synthetic resins from the compounds according to the invention is carried out by processes known per se, involving reactions with polyisocyanates and higher molecular weight compounds which contain end groups which are reactive with isocyanates. The process may be carried out by first reacting a calculated quantity of the higher molecular weight compounds, then adding the chain lengthening agents according to the invention and then reacting the mixture either in the presence or absence of a substance which decomposed to liberate a gas.

Another possibility consists in mixing the compounds according to the invention with the higher molecular weight compounds and then carrying out the reaction with isocyanates. The reaction of the new chain lengthening agents with polyisocyanates may be carried out in the presence of any of the additives known in polyisocyanate chemistry, e.g. catalysts, compounds which liberate gases or flame-retarding substances.

Higher molecular weight compounds which are especially suitable for the present process are higher molecular weight hydroxyl compounds, e.g. the following: Conventional types of polyhydroxyl compounds having a molecular weight of 750 to 10,000, for example linear or slightly branched polyesters with terminal hydroxyl groups which may be prepared by known processes, e.g. from monohydric or polyhydric alcohols and carboxylic acids or hydroxycarboxylic acids, if desired, with the addition of amino alcohols, diamines, hydroxylamines and diaminoalcohols. Especially to be mentioned among the polyesters are the aliphatic polycarbonates such as hexanediol polycarbonate and caprolactone polyesters which are obtained by the polymerisation of caprolactone in the presence of starter molecules such as glycols. Linear or branched polyethers which may be obtained by the polymerisation of alkylene oxides such as ethylene oxide, propylene oxide, epichlorohydrin or tetrahydrofuran are also suitable. Copolymers of this type may also be used. Linear or branched addition products which may be obtained by the addition of the above mentioned alkylene oxides, for example to polyfunctional alcohols, amino alcohols, or amines are also suitable.

The starting compounds for the process according to the invention are preferably polyethers which contain at least 2 active hydrogen atoms and preferably have a molecular weight of 750 to 10,000 in which at least 10% of the hydroxyl groups present are primary OH groups. The primary OH groups are determined by the method of Gordon Hanna and Sydney Siggia, Journal of Polymer Science, Vol. 56, pages 297–304 (1962). Polyethers of this type are prepared by reacting compounds which contain active hydrogen atoms, e.g. polyalcohols and polyphenols, with alkylene oxides such as ethylene oxide, propylene oxide, butylene oxide, styrene oxide or epichlorohydrin or with mixtures of these alkylene oxides, if desired, followed by tipping of the resulting polyethers with ethylene oxide.

The following are examples of suitable polyalcohols and polyphenols: ethylene glycol, diethylene glycol, polyethylene glycol, propane-1,2-diol, propane-1,3-diol, butane-1,4-diol, hexane-1,6-diol, decane-1,10-diol, butyne-2-, diol-1,4, glycerol, butane-2,4-diol, hexane-1,3,6-triol, trimethylolpropane, resorcinol, di-tert.-butylpyrocatechol, 3-hydroxy-2-naphthol, 6,7-dihydroxy-1-naphthol, 2,5-dihydroxy-1-naphthol, 2,2-(p-hydroxyphenyl)propane, bis-(p-hydroxyphenyl)methane, tris-(hydroxyphenyl)alkanes such as 1,1,2-tris-(hydroxyphenyl)methane or 1,1,3-tris-(hydroxyphenyl)propane. Other suitable polyethers include 1,2-alkylene oxide derivatives of aliphatic or aromatic mono- or polyamines such as ammonia, methylamine, ethylenediamine, N,N'-dimethylethylenediamine, tetra- or hexamethylene diamine, diethylenetriamine, ethanolamine, diethanolamine, methyldiethanolamine, triethanolamine, aminoethylpiperazine, toluidine, o-, m- and p-phenylenediamine, 2,4- and 2,6-diaminotoluene and 2,6-diamino-p-xylene and multinuclear and condensed aromatic polyamines such as 1,4-naphthylene diamine, benzidine, 2,2'-dichloro-4,4'-diphenyldiamine and 4,4'-diaminoazobenzene. Resinous materials of the phenol and resol type may also be used as starting materials.

All these polyethers have preferably been synthesized with ethylene oxide as one of the starting materials and preferably contain at least 10 percent of primary OH groups. The above mentioned polyethers may also be modified by reacting them with less than equivalent quantities of polyisocyanate.

Other higher molecular weight compounds which have active hydrogen atoms include the known polyacetals, polyester amides, polycarbonates and polyols which contain urethane groups. The higher molecular weight compounds with reactive hydrogen atoms to be used according to the invention may also be used in mixtures with low molecular weight compounds with active hydrogen atoms which have molecular weights of up to 750. Suitable low molecular weight compounds with active hydrogen atoms are especially the compounds which have hydroxyl groups, e.g. ethylene glycol, 1,3-butylene glycol, 1,4-butylene glycol, glycerol, trimethylolpropane, castor oil or addition products, generally in the molecular weight region of 200 to 750, of alkylene oxides such as ethylene oxide, propylene oxide or butylene oxide with low molecular weight compounds of this type which have active hydrogen atoms or with water.

Higher molecular weight compounds which contain amino groups, e.g. those which have terminal amino groups, represented by the general formula

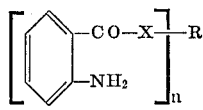

in which $n$ denotes an integer of from 2 to 8,

X represents an oxygen or sulphur atom and

R represents an $n$-valent radical of the type which is obtained by removal of hydroxyl or mercapto groups from an $n$-valent polyalkylene ether polyol or from a polyalkylene thioether polythiol, and which are prepared by a process characterised in that compounds of the general formula $$(HX)_nR$$

having a molecular weight of 600 to 10,000 are reacted with at least $n$ equivalents of isatoic acid anhydride in the presence of strong bases.

In this case, the formation of urethane groups as chain linking groups does not take place as in the polyurethane resins hitherto described but instead, the synthetic resins produced contain urea groups in addition to ester and ether groups.

The isocyanates used may be any of the conventional polyisocyanates and preferably the following: butane-1,4-diisocyanate, hexane-1,6-diisocyanate, octamethylene-1,8-diisocyanate; carboxylic acid ester diisocyanates, cycloaliphatic diisocyanates such as 1-methyl-cyclohexane-2,4- and -2,6-diisocyanate and any mixtures of these isomers, cyclohexane-1,4- and -1,3-diisocyanate, dicyclohexylmethane-4,4'-diisocyanate, araliphatic diisocyanates such as xylylene-1,3- and -1,4-diisocyanate, aromatic diisocyanates such as tolylene-2,4- and -2,6- diisocyanate and any mixtures of these isomers, phenylene-1,3- and -1,4-diisocyanate, diphenylmethane-4,4'-diisocyanate and naphthylene-1,5-diisocyanate. A certain amount of triisocyanates such as benzene-1,3,5-triisocyanate or triphenylmethane-4,4',4''-triisocyanate may also be included. According to the invention, the isocyanates preferably used are tolylene-2,4-diisocyanate and tolylene-2,6-diisocyanate and isomeric mixtures thereof, diphenylmethane-4,4'-diisocyanate, naphthylene-1,5-diisocyanate and polyphenylpolymethylene polyisocyanates which may be obtained by aniline formaldehyde condensation followed by phosgenation and their mixtures with tolylene-2,4- and/or 2,6-diisocyanate, if desired, in admixture with diphenylmethane-4,4'-diisocyanate and its isomers.

According to the invention, the polyisocyanates used are preferably solutions of so-called modified polyisocyanates, i.e. solutions of polyisocyanates which have biuret groups in polyisocyanates which are free from biuret groups and/or solutions of polyisocyanates which have at least two NCO groups and at least one N,N'-disubstituted allophanic acid ester group in polyisocyanates which are free from allophanic acid ester groups and/or solutions of reaction products of polyisocyanates and divalents or higher valent compounds which contain hydroxyl groups in polyisocyanates which are free from urethane groups and/or solutions of polyisocyanates which contain more than one NCO group and at least one isocyanuric acid ring in polyisocyanates which are free from isocyanurate groups.

The solutions of "modified polyisocyanates" which are preferably used for the invention generally contain 1 to 85% by weight and preferably 10 to 50% by weight of "modified polyisocyanates."

The allophanate polyisocyanates may be prepared e.g. in accordance with Belgian Pat. 761,626. The polyisocyanates used for this purpose are preferably diisocyanates such as tolylene-2,4-diisocyanate or mixtures of this with tolylene-2,6-diisocyanate.

Modified polyisocyanates used according to the invention may also be solutions of polyisocyanates which contain biuret groups in polyisocyanates which are free from biuret groups. According to the invention, it is preferred to use solutions at concentrations of 1 to 85% by weight of polyisocyanates which contain biuret groups, represented by the following general formula:

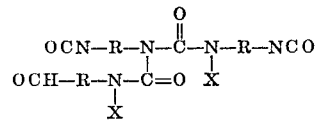

in which R represents a $C_1$–$C_{10}$ alkyl radical, $C_5$ to $C_{10}$ cycloalkyl radical, $C_7$ to $C_{12}$ aralkyl radical or $C_6$ to $C_{10}$ aryl radical and X represents hydrogen or the group

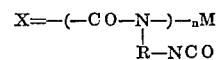

in which R has the meaning already given above and $n$ represents an integer of from 0 to 5 in polyisocyanates which are free from biuret groups, the proportion of biuret polyisocyanates which have more than 3 isocyanate groups being at least 20% by weight based on the total quantity of biuret polyisocyanates. Polyisocyanates which contain biuret groups may be prepared e.g. according to the method disclosed in British Patent Specification No. 889,050 or according to the method of German Patent Specification No. 1,101,394. The polyisocyanates preferably used according to the invention are solutions in polyisocyanates which are free from biuret groups of biuret polyisocyanates which have been prepared by reacting either 2,4- and/or 2,6-tolylene diisocyanate, 4,4'-diphenyl methane diisocyanate and/or its isomers or a polyisocyanate mixture resulting from aniline formaldehyde condensation followed by phosgenation, with water or formic acid. The polyisocyanates for use according to the invention preferably contain 0.03 to 5% by weight and especially 0.1 to 2% by weight of chemically bound emulsifiers. These emulsifiers should contain OH, amino, amido, COOH, SH or urethane groups and are therefore incorporated into the polyisocyanate by reaction with the isocyanate groups.

The isocyanate components used as starting material may, moreover, be polyisocyanates of the type which are characterised by containing a certain amount of urethane-containing polyisocyanates and, if desired, having a higher degree of branching than purely difunctional isocyanates. These isocyanates often contain 10 to 70% and preferably 20 to 50% of isocyanates which contain urethane groups dissolved in polyisocyanates which are free from urethane groups.

The modified polyisocyanates may also be solutions of polyisocyanates which contain at least one isocyanuric acid ring in liquid polyisocyanates which are free from isocyanurate groups. Polyisocyanates which contain such isocyanurate groups and processes for their preparation have been described, e.g. in German Patent Specification Nos. 951,168; 1,027,394; 1,022,789 and 1,123,729 in British Patent Specifications 821,158; 827,120; 856,372; 927,173; 920,080 and 952,931, in U.S. Patent Specification Nos. 3,154,522 and 2,801,244, in French Patent Specification No. 1,510,342 and in Belgian Patent Specification No. 718,994. Polyisocyanates having at least one isocyanuric acid ring are preferably polymeric tolylene-2,4- and/or -2,6-diisocyanates, if desired, mixed with 4,4'-diphenylmethane-diisocyanate or its isomers. These isocyanates which may be used according to the invention are obtained by dissolving the polyisocyanate which contains isocyanurate groups in the liquid polyisocyanates which are free from isocyanurate groups, generally in amounts of 1 to 85% by weight based on the weight of the resulting polyisocyanate solutions.

The polyisocyanates which are free from urethane groups or biuret groups may be any aliphatic, cycloaliphatic, aromatic or araliphatic isocyanates, e.g. those described in Liebigs Annalen der Chemie, Volume 562 (1949), pages 755 et seq. Preferably, tolylene isocyanate or its isomeric mixtures or isomeric mixtures of this type which have not been distilled, diphenylmethane-4,4'-diisocyanate or diphenylmethane-2,4'-diisocyanate or the undistilled crude diisocyanates, naphthalene-1,4-diisocyanate, triphenylmethane-4,4,4''-triisocyanate, isophorone diisocyanate, polyphenylpolymethylene polyisocyanates obtained by the condensation of aniline and/or alkyl substituted anilines with formaldehyde followed by phosgenation or the isocyanates which contain adducts of carbodiimide and isocyanate, e.g. those obtained according to German Patent Specification No. 1,092,007, are used.

The production of self extinguishing polyurethane foam resins is generally carried out by the known one shot process. In this process, the foam resins are produced at room temperature and/or elevated temperature simply by mixing the above described polyisocyanates according to the invention with the higher molecular weight polyols, water and/or other blowing agents and, if desired, emulsifiers and other additives as well as the auxiliary agents according to the invention being used. Mechanical devices are advantageously used for this purpose, e.g. those described in French Patent Specification No. 10 747 143 and the process described in German Patent Specification No. 881,881.

Suitable emulsifiers are e.g. ethylene oxide or the addition products of ethylene oxide and propylene oxide with hydrophobic substances which contain hydroxyalkylene groups or amino groups or amido groups. Suitable catalysts for the production of flame resistant, non-shrinking foam resins which contain urethane groups are tertiary amines and/or sila-amines, N-substituted aziridines or hexahydrotriazine, if desired, in combination with organic metal compounds. These catalysts vary in the extent to which they accelerate the different partial reactions of foam formation. Whereas amines preferentially catalyse the expanding reaction, organic metal compounds have a preferential catalytic effect on the cross-linking reaction. The catalytic effect on the expanding reaction, i.e. for example the reaction between isocyanate groups and water with evolution of carbon dioxide, may vary according to the constitution of the amines or silaamines. The quantity of catalyst necessary to achieve reaction times which are advantageous for the foaming technique are determined empirically according to the constitutions of the given catalyst. The amines used may be those well known for the production of polyurethane foam resins, for example dimethyl benzylamine, N- methylmorpholine, triethylenediamine, dimethylpiperazine, 1,2-dimethylimidazole, dimethylethanolamine, diethanolamine, triethanolamine, diethylaminoethanol, N,N',N'', N'''-tetramethyl-1,3-butanediamine and N-methyl-N'-dimethyl-aminoethylpiperazine.

The silaamines used are silicon compounds which contain carbon silicon compounds, e.g. those described in German Patent Specification No. 1,229,290. 2,2,4-trimethyl - 2 - silamorpholine and 1,3-diethyl-aminomethyl-tetramethyldisiloxane may be mentioned as examples, but bases which contain nitrogen, such as tetraalkylammonium hydroxides and alkalies, alkali metal phenolates or alcoholates, e.g. sodium methylate, should also be noted. The organic metal compounds which may be used in combination with amines, silaamines and hexahydrotriazines according to Belgian Patent Specification No. 730,356 are preferably organic tin compounds, e.g. tin-(II)-octoate or dibutyl tin dilaurate.

Additives for regulating the cell structure may be used as may also organic or inorganic fillers and dyes or plasticisers such as phthalic acid esters.

Foam resins produced by the process according to the invention are flameproof when produced with flame-retarding additives of known type and are to be classified as self extinguishing in accordance with the ASTM test D 1692–67 T. This most desirable property can be achieved by means of known flame retarding agents such as trichloro- and tribromo-alkylphosphates. It is partly lost under extreme storage conditions such as high temperatures over prolonged periods of time. Permanent and substantial improvement in the already high flame resistance of the products of the process can be achieved e.g. by modifying the modified polyisocyanate solutions with compounds which contain chlorine and/or bromine and which can be incorporated into the polyisocyanates, i.e. which contain hydrogen atoms that are reactive with isocyanates. As regards the effect achieved, it is immaterial at what point these flame retarding agents which can be incorporated are introduced, for example whether they are built directly into the modified polyisocyanate or added subsequently to the polyisocyanate solutions or reaction mixtures.

The following are given as examples of flame-retarding agents which can be incorporated: 2-chloroethanol, 2-bromoethanol, trichloroethanol, 1,3-dichloropropanol, 1,2-dichloropropanol, 2-bromopropanediol, 1,1 - styrenechlorohydrin and styrene bromohydrin, bromoacetic acid.

The elastic and semielastic foam resins obtainable by the process according to the invention may be used, for example, as cushioning material, mattresses, packaging material, foils for backing, insulating material and, owing to their flame resistance, they can be used wherever this property is particularly important, e.g. in motor vehicles, in aircraft construction and in transport in general. The foam resins may be produced either by foaming in the mould or by manufacturing them from material which has been foamed in blocks.

EXAMPLE 1

Chain lengthening agent used: Butanediol dianthranilate. Melting point 107–108° C. Calculated: C, 65.8; H, 6.15; N, 8.54. Found: C, 65.7; H, 6.3; N, 8.5.

100 parts of a prepolymer of tetrahydrofuran having an average molecular weight of 1700 and 2,6-diisocyanatotoluene having a free NCO content of 4.1% and 15 parts of molten butanediol dianthranilate are cast at 110° C. and the resulting polyurethane resin is tempered at 110° C. for 24 hours. After this heat treatment, a soft synthetic resin which has the following properties is obtained:

Tensile strength (DIN 53504) _____kg. wt./cm.$^2$__ 63
Elongation at break (DIN 53504) _____percent___ 890
Shore hardness A (DIN 53505) _____ 48
Elasticity (DIN 53512) _____percent___ 31

EXAMPLE 2

Chain lengthening agent used: Thiodiglycol dianthranilate. Melting point: 69–70° C. Calculated: C, 60.1; H, 55; N, 7.8; S, 8.9. Found: C, 60.4; H, 5.8; N, 7.6; S, 8.9.

200 g. of a polyester (OH number 56) obtained from adipic acid and ethylene glycol are dehydrated in a vacuum at 130° C., and 40 g. of an isomeric mixture of 80% by weight of 2,4- and 20% by weight of 2,6-tolylene diisocyanate are added at 120° C.

The reaction mixture is then stirred for 30 minutes and evacuated to remove air for 30 seconds, and 36.6 g. of molten thiodiglycol dianthranilate are then run in with stirring. The mixture sets after 15 minutes at 100°

C. to form a soft polyurethane resin of low elasticity which has the following properties:

Tensile strength (DIN 53504) _____kg. wt./cm.$^2$__ 170
Elongation at break (DIN 53504) _____percent__ 740
Shore hardness A (DIN 53505) _____ 54
Elasticity (DIN 53512) _____percent__ 16

EXAMPLE 3

Chain lengthening agent used: Butane-1,4-diol-dianthranilate.

200 g. of an aminopolyether which has been obtained by complete reaction of a polypropylene oxide of molecular weight 2000 with 2 mols of isotoic acid anhydride are reacted with 40 g. of an isomeric mixture of 80% by weight of 2,4- and 20% by weight of 2,6-tolylene diisocyanates for ½ hour at temperatures of 70 to 80° C. to form a prepolymer. The reaction mixture is then heated to 90° C. and at the same time it is evacuated and mixed at that temperature with molten chain lengthening agent with stirring. After 24 hours' heating at 100° C., a synthetic resin which has the following properties is obtained:

Tensile strength (DIN 53504) _____kg. wt./cm.$^2$__ 154
Elongation at break (DIN 53504) _____percent__ 327
Shore hardness A (DIN 53505) _____ 87
Elasticity (DIN 53512) _____percent__ 29

EXAMPLE 4

Chain lengthening agent: Diethylene glycol dianthranilate. Melting point: 105–106° C. Calculated: C, 62.8; H, 5.85; N, 8.5. Found: C, 63.0; H, 5.9; N, 8.2.

The procedure is the same as in Example 3 but using 48.7 g. of diisocyanate and 59 g. of diethylene glycol dianthranilate. After 24 hours' heating at 100° C., a synthetic resin which has the following properties is obtained:

Tensile strength (DIN 53504) _____ kg. wt./cm.$^2$__ 168
Elongation at break (DIN 53504) _____percent__ 485
Shore hardness A (DIN 53505) _____ 85
Elasticity (DIN 53512) _____percent__ 31

COMPARISON EXAMPLE

Preparation of a hard polyurethane foam resin

Component A: 60 Parts by weight of (2-ethyl) hexyl ester of 4-chloro-3,5-diamino-benzoic acid, 40 parts by weight of an addition product of propylene oxide and trimethylolpropane (OH number 550), 1 part by weight of silicone stabiliser, 3 parts by weight of N-methyl-N'-(N,N-dimethylamino-ethyl)-piperazine and 10 parts by weight of monofluoro trichloromethane are intimately mixed.

Component B: 730 Parts by weight of a polyether (dipropyleneglycol and propylene oxide, OH number 148) are added dropwise to 660 parts by weight of 2,4-/2,6-tolylene diisocyanate (80:20) with stirring. The temperature rises to 50° C. The mixture is then heated to 80° C. and kept at this temperature until the NCO content is 17%.

11 Parts by weight of Component A and 230 parts by weight of Component B are intimately stirred together and introduced into a closed metal mould (dimensions of mould (dimensions of mould 500 x 200 x 10 mm.). The temperature of the mould is 70° C. The reactive mixture starts to foam after 25 seconds and gels after a further 35 seconds. After 10 minutes, the moulding is removed from the mould. The moulding has a solid marginal zone and a cellular core.

Physical properties of the moulding: Elastic modulus in the bending test (DIN 53423) $E_b$=2400 kg. wt./cm.$^2$.

Dimensional stability in the heat under bending stress according to DIN 53424, bending stress approximately 3 kg. wt./cm.$^2$ at a deflection of 10 mm.:

$$HB_{10}=39° C.$$

EXAMPLE 5

The chain lengthening agents used are an adduct of ethylene oxide and trimethylolpropane having an average molecular weight of 306. Two OH groups of this adduct are reacted with isotoic acid anhydride to form anthranilic acid ester, the resulting molecular weight being 544.

The procedure is the same as in the comparison example except that 40 parts by weight of the chain lengthening agent mentioned above are used instead of 40 parts by weight of the polyether (OH number 550) in component A, and 170 parts by weight of component B are used instead of 230 parts by weight of this component.

Physical properties of the moulded product:

Elastic modulus in the bending test (DIN 53423)

$$E_b=5600$$

kg. wt./cm.$^2$

Dimensional stability in the heat under bending stress according to DIN 53423, bending stress approximately 3 kg. wt./cm.$^2$ at a deflection of 10 mm.:

$$HB_{10}=78° C.$$

EXAMPLE 6

Chain lengthening agent tripropylene glycol trianthranilate

A mixture is prepared from 100.0 parts by weight of a polyether prepared by reacting propylene oxide and then ethylene oxide with trimethylolpropane to result in approximately 60% of primary hydroxyl groups in the end positions and an OH number of 35.0, 2.5 parts by weight of water, 0.4 parts by weight of endoethylenepiperazine, 1.0 parts by weight of triethylamine and 6.0 parts by weight of tripropylene glycol dianthranilate, and the mixture is reacted with 36.0 parts by weight of a mixture (NCO content 39.5%) of 60.0 parts by weight of 2,4-tolylene diisocyanate, 10.0 parts by weight of 2,6-tolylene diisocyanate and 30.0 parts by weight of a polymerised 2,4-tolylene diisocyanate (NCO content 20.8%).

A foam resin which has the following mechanical properties is obtained:

Unit weight according to DIN 53420 (kg./m.$^3$) ____ 40
Tensile strength according to DIN 53571 (wt./cm.$^2$) _____ 1.0
Elongation at break according to DIN 53571 (percent) _____ 180
Compression test at 40% compression according to DIN 53577 (p./cm.$^2$) _____ 25
Pressure distortion residue 50% according to DIN 53572 _____ 5.5

What is claimed is:

1. Synthetic resins produced by the isocyanate polyaddition process comprising reacting a polyisocyanate with an aromatic diamine of the general formula

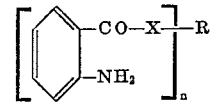

wherein $n$ represents an integer of from 2 to 8, X represents an oxygen or sulphur atom, and R represents an $n$-valent saturated or unsaturated, straight chain or branched chain hydrocarbon radical which may be interrupted by O or S atoms and is obtained by the removal of OH or SH groups from a polyol or polythiol having a molecular weight below 600.

2. The resin of claim 1 wherein the aromatic diamine is

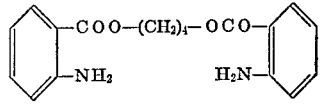

3. The resin of claim 1 wherein the aromatic diamine is

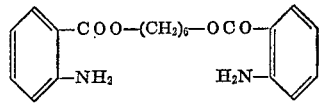

4. The resin of claim 1 wherein the aromatic diamine is
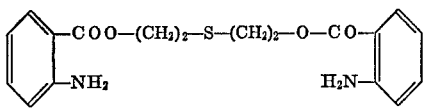
5. The resin of claim 1 wherein the aromatic diamine is
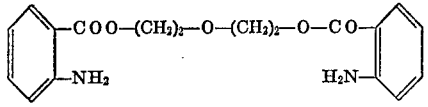
6. The resin of claim 1 wherein the aromatic diamine is
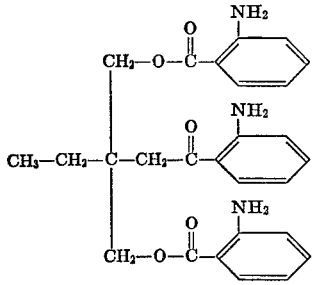
7. The resin of claim 1 wherein the aromatic diamine is
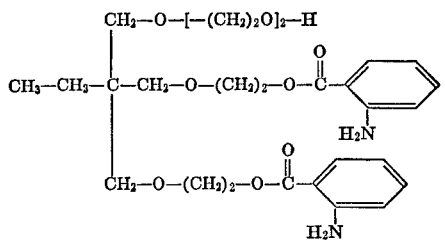
References Cited
UNITED STATES PATENTS
3,736,295  5/1973  Meckel et al. ____ 260—77.5 AM
MAURICE J. WELSH, Primary Examiner
U.S. Cl. X.R.
260—471 R